United States Patent [19]

Wolfe

[11] 4,110,660

[45] Aug. 29, 1978

[54] LUMINESCENT BARIUM-LITHIUM ALUMINATE PHOSPHORS AND LAMP CONTAINING THE SAME

[75] Inventor: Robert W. Wolfe, Towanda, Pa.

[73] Assignee: GTE Sylvania Incorporated, Stamford, Conn.

[21] Appl. No.: 727,231

[22] Filed: Sep. 27, 1976

Related U.S. Application Data

[63] Continuation of Ser. No. 559,692, Mar. 19, 1975, abandoned.

[51] Int. Cl.$^2$ ............................................. C09K 11/46
[52] U.S. Cl. .............................. 313/486; 252/301.4 R
[58] Field of Search .................. 252/301.4 R; 313/486

[56] References Cited

U.S. PATENT DOCUMENTS

| 3,457,184 | 7/1969 | Kobayashi et al. | 252/301.4 R |
| 3,458,451 | 7/1969 | Kobayashi et al. | 252/301.4 R |
| 3,577,350 | 5/1971 | Amster | 252/301.4 R |
| 3,635,833 | 1/1972 | Datta | 252/301.4 R |
| 3,723,339 | 3/1973 | Wanmaker | 252/301.4 R X |
| 3,856,697 | 12/1974 | Verstegen et al. | 252/301.4 R |

FOREIGN PATENT DOCUMENTS

| 47-9,563 | 3/1972 | Japan | 252/301.4 R |
| 7,214,862 | 5/1974 | Netherlands. | |
| 1,190,520 | 5/1970 | United Kingdom | 252/301.4 R |

OTHER PUBLICATIONS

Tamatani "Japanese Journal of Applied Physics" vol. 13, No. 6, pp. 950-956, 1974.
Blasse et al. "J. Electrochem Soc." vol. 115, (No. 6), p. 673, 1968.

*Primary Examiner*—Jack Cooper
*Attorney, Agent, or Firm*—Norman J. O'Malley; John C. Fox; Donald R. Castle

[57] ABSTRACT

Luminescent materials having a host of controlled amounts of barium oxide, controlled amounts of lithium oxide, and the balance aluminum oxide when activated by divalent europium alone yield a blue emission when excited by ultraviolet light and activated by europium in combination with divalent manganese yield a bright green emission under ultraviolet light. The host can be a solid solution of the foregoing oxides or it can contain alpha alumina and spinel as additional phases. These materials are used to produce lamps having enhanced emission characteristics as compared to lamps employing luminescent materials having a host of aluminum oxide in combination with barium oxide and activated by europium or europium manganese or to lamps employing magnesium gallate, activated by manganese.

7 Claims, 3 Drawing Figures

LUMINESCENT BARIUM-LITHIUM ALUMINATE PHOSPHORS AND LAMP CONTAINING THE SAME

CROSS-REFERENCE TO RELATED APPLICATION

This application is a continuation of Ser. No. 559,692, filed Mar. 19, 1975, now abandoned and assigned to the assignee of the present invention.

BACKGROUND OF THE INVENTION

This invention relates to luminescent materials. More particularly, it relates to luminescent materials which have enhanced properties for fluorescent lamps as compared to compositions that were known in the prior art for such usages.

PRIOR ART

In U.S. Pat. No. 3,577,350 it is disclosed that divalent manganese with divalent europium enhances the green fluorescent intensity of the host compounds, $K_2Al_{12}O_{19}$ and $Na_2Al_{12}O_{19}$. These materials have certain improved characteristics, however, are not an improvement over zinc orthosilicate activated with manganese previously used in certain fluorescent lamps.

F. A. Kroger in "Some Aspects of the Luminescence of Solids", Elsevier Publishing Company, Inc., 1948, describes the preparation of the luminescent properties of the compounds $R^{2+}Al_{12}O_{19}$ wherein R is barium, strontium or calcium when activated by manganese. These materials when activated with europium and manganese are equivalent in certain characteristics to the sodium and potassium aluminates disclosed in U.S. Pat. No. 3,577,350. However, the Kroger materials when activated with the dual activators are superior for certain types of fluorescent lamps.

It is believed, therefore, that a fluorescent material which is an improvement over the aluminates of the prior art, manganese activated zinc orthosilicate and manganese activated magnesium gallate which materials are currently used in the fluorescent lamps for xerography would be a substantial advancement in the art.

OBJECTS AND SUMMARY OF THE INVENTION

It is an object of this invention to provide a new luminescent material.

It is a further object of this invention to provide a luminescent material which can be used efficiently in the lamps used in xerography.

It is an additional object of this invention to provide a process for preparing new luminescent barium-lithium aluminates.

It is still another object of this invention to provide a fluorescent lamp which has improved operating characteristics.

These and other objects of this invention are achieved in one aspect of the invention wherein there is provided a luminescent composition consisting essentially of a host having from about 2 to about 8 mole percent and preferably 4 to 7 mole percent of barium oxide (BaO) from about 0.5 to about 20 mole percent and preferably 5 to 14 mole percent of lithium oxide ($\frac{1}{2}Li_2O$), and from about 80 to 97.5 mole percent of aluminum oxide ($\frac{1}{2}Al_2O_3$) and, as an activator, from an effective amount to about 0.2 moles per mole of host of divalent europium oxide (EuO), from about 0 to about 0.45 moles per mole of host of divalent manganese (MnO) wherein in the composition the lithium content is not greater than 1% by weight after heat treatment.

In an additional aspect of the invention, the luminescent compositions are prepared by forming an admixture of appropriate sources of the barium oxide, the lithium oxide, and the aluminum oxide with appropriate sources of the desired activator. Alternately the oxides can be formed in situ by using the appropriate salts instead of the oxides. After the admixture is prepared, it is heated in a reducing atmosphere at a temperature of from about 1400° to about 1600° C for a period of from 3 to 7 hours.

In still another aspect of this invention, there is provided an improved lamp comprising a pair of opposing electrodes, a glass envelope about said electrodes, a fill of an ionizable gas and a coating of luminescent barium-lithium oxide aluminate of a composition as described above over at least a portion of the envelope.

DETAILS OF THE PREFERRED EMBODIMENTS

For a better understanding of the present invention, together with other and further objects, advantages, and capabilities thereof, reference is made to the following disclosure and appended claims in connection with the above-described drawings.

Although the formula is not known with certainty since the materials formed can be oxygen deficient when sources of raw materials other than oxides are used, the following characteristic formula is believed to represent the compounds of the present invention when there is no oxygen deficiency and the loss of lithium that occurs is neglected:

$$Ba_wLi_xAl_{11}O_{16.5 + w + x + y + z} \cdot y\,Eu\,z\,Mn$$

where $w$ lies between 0.226 and 1.100 and preferably between 0.46 and 0.940, $x$ lies between 0.056 and 2.475 and preferably between 0.058 and 1.880, $y$ lies between 0.01 and 0.200 and preferably between 0.025 and 0.125, $z$ lies between 0 and 0.45 and preferably between 0 and 0.35.

Figure 1:
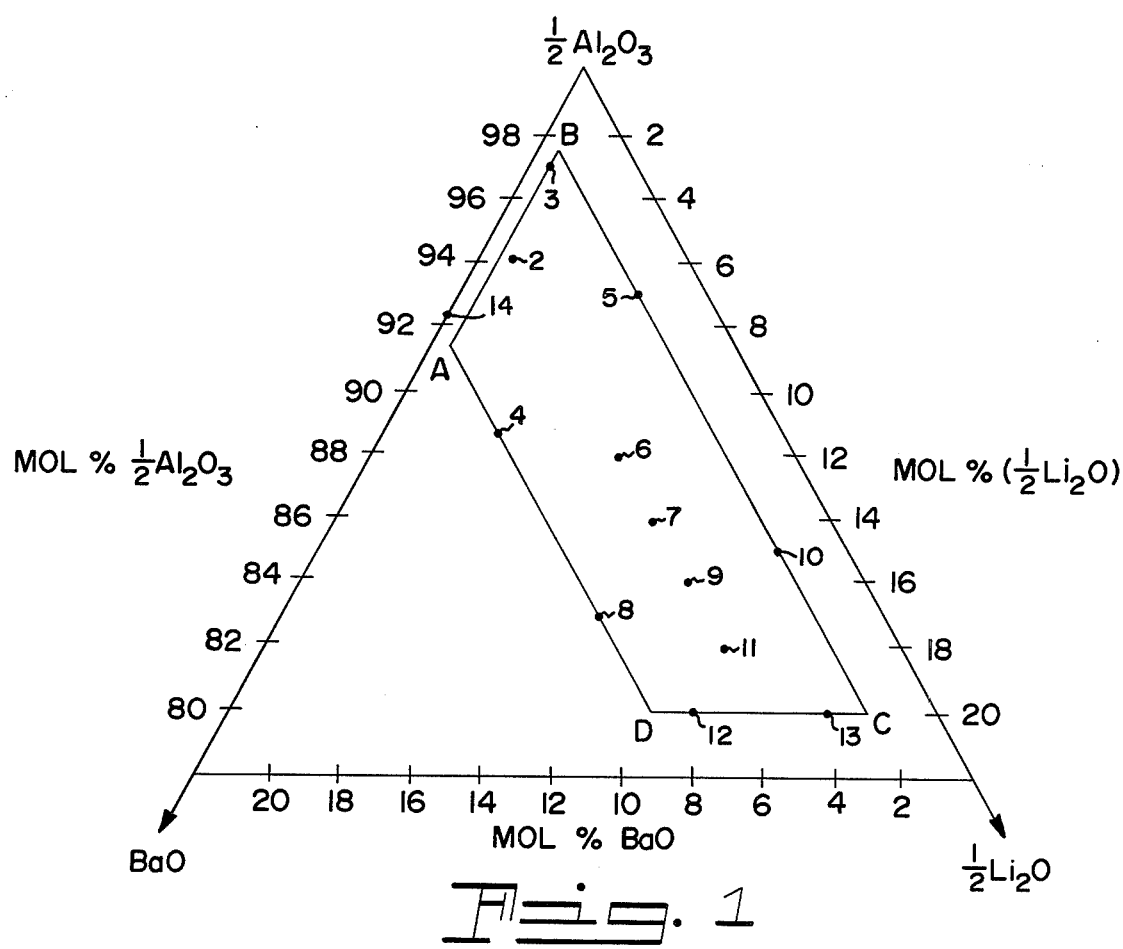
FIG. 1 illustrates the tertiary diagram for the phosphor host materials of this invention.
Figure 2:
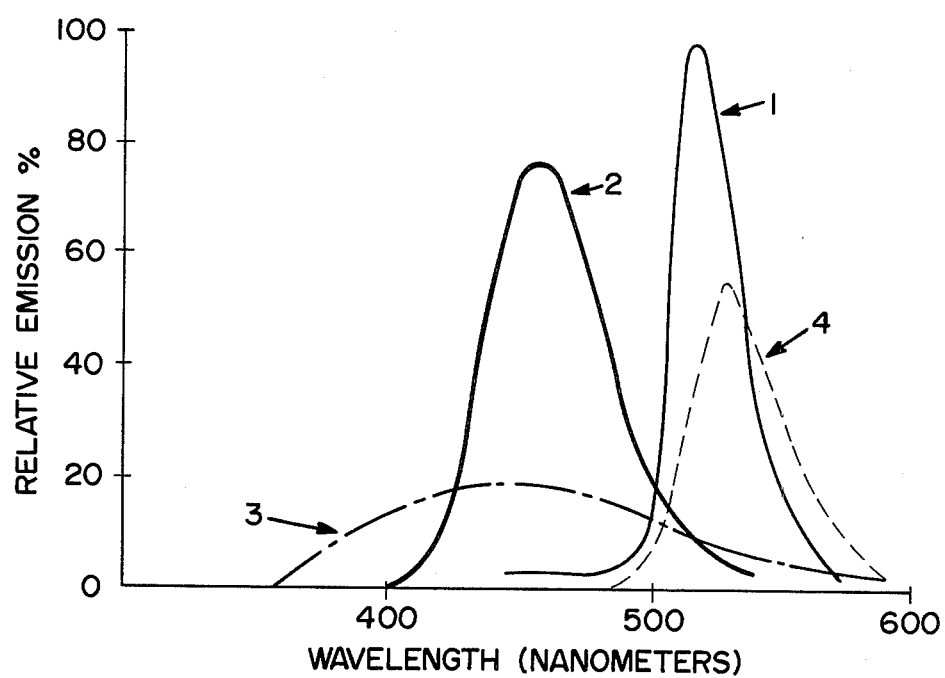
FIG. 2 illustrates the emission characteristics of typical phosphors of this invention and known prior art phosphors.

The region of ternary system $BaO \cdot \frac{1}{2}Li_2O \cdot \frac{1}{2}Al_2O_3$ covered by these composition limits is shown by the quadrilateral area, ABCD, in FIG. 1. Phosphors in this region are characterized by a strong green luminescence at about 515±2 nm when doubly activated with both $Eu^{2+}$ and $Mn^{2+}$, and a strong blue luminescence at about 455±5 nm when activated with $Eu^{2+}$ alone. FIG. 2 shows typical emission spectra for some of the phosphors within the before-mentioned area of FIG. 1 and emission spectra for the National Bureau of Standard samples of $CaWO_4$:Pb and $Zn_2SiO_4$:Mn.

The following data illustrates the variability of the amount of lithium retained in the phosphor host after heat treatment. These data are for a four-hour firing in hydrogen at 1550° C.

| Point in FIG. 1 | Starting Composition Theoretical Wt. % | | | Fired Material Wt. % By Atomic Absorption | | | % Li Retained |
|---|---|---|---|---|---|---|---|
| | Ba | Li | Al | Ba | Li | Al | |
| 6 | 12.5 | 0.87 | 43.3 | 11.5 | 0.24 | 43.8 | 28 |
| 9 | 13.2 | 1.40 | 43.5 | 12.6 | 0.29 | 43.4 | 21 |
| 13 | 8.4 | 2.38 | 44.0 | 8.0 | 0.84 | 45.6 | 35 |

There is a substantial amount of loss of lithium during firing due to vaporization. Chemical analysis of fired phosphor show that the amount of lithium incorporated in the structure is proportional to the amount of starting composition, and that the lithium content is about 20-40% of that in the starting materials. The amount of loss is dependent on the firing history of the original source of lithium, however, the fired composition will contain only up to 1% by weight of lithium. The loss of barium and aluminum during firing has been found to be negligible.

Table II shows the relative brightness and phase assemblages of representative compositions with total Ba and Li content lying within the area shown in FIG. 1. The compositions in Table II are based upon the starting ratio of oxides. The chemical analysis of phosphors of this invention have been found to fall within the area, ABCD, in FIG. 1.

The phosphor compositions of this invention can be synthesized by dry blending the appropriate sources of starting materials. While the carbonates, oxides, and fluorides can be used, other appropriate sources are salts and bases which will upon heating to about 1000° C in a reducing atmosphere decompose to the cation which will react with oxygen to form oxides. It was found, however, that the use of fluorides of the type $BaF_2$ and $LiF_2$ and the use of aluminum hydroxide resulted in the easier formation of phosphors with high luminescent efficiency hence are particularly preferred. The blend is generally fired in a hydrogen atmosphere in the temperature range of from about 1400° C to about 1650° C for a period of from 3 to 6 hours. At temperatures above about 1600° C, $Mn^{+2}$ in the composition can be lost due to volatilization.

To more fully illustrate the invention, the following detailed examples are presented. All parts, percentages, and proportions are by weight unless otherwise indicated.

EXAMPLE I

About 1.531 parts of $BaF_2$, about 0.498 parts of LiF, and about 11.440 parts of $Al(OH)_3$ are dry blended with about 0.225 parts of $Eu_2O_3$ and about 0.537 parts of $MnCO_3$. The blend is placed in an alumina crucible and fired in a hydrogen atmosphere for about four hours at about 1550° C. The sample is allowed to cool in the furnace to about ambient temperature. The resultant phosphor with starting formula $Ba_{0.655}Li_{1.440}Al_{11}O_{18.2}$: 0.096 Eu, 0.35 Mn (Point 9 in FIG. 1) responds to ultraviolet excitation with a bright green luminescence peaking at 515 nm, with an emission half width of 29 nm, as shown in FIG. 2 as line 1. The same composition, with the deletion of $MnCO_3$, blended and fired as above responds to ultraviolet radiation with an intense blue emission peaking at 457 nm with a halfwidth of about 55 nm. The emission of this phosphor, starting composition $Ba_{0.655}Li_{1.440}Al_{11}O_{17.9}$: 0.096 Eu, is also shown as line 2 in FIG. 2. The emission of $CaWO_4$:Pb (NBS1026) is shown as line 3 in FIG. 2 and the emission of $Zn_2SiO_4$:Mn (NBS1028) is shown in line 4 in FIG. 2.

As can be seen from the emission characteristics of the phosphors shown in FIG. 2, both compositions of this invention are more efficient phosphors than the two prior art phosphors.

EXAMPLE II

The following lamp test data show the performance of representative compositions of this invention as compared to the well known $MgGa_2O_4$:Mn, used extensively in high-load xerographic lamps.

TABLE I

| Composition | No. in FIG. 1 | 0 Hrs. | 100 Hrs. | % Maintenance |
|---|---|---|---|---|
| $MgGa_2O_4$: Mn | | 25.0 | 21.9 | 88.5 |
| $Ba_{.639}Li_{1.151}Al_{11}O_{13.2}$: 0.096 Eu, 0.35 Mn[1] | 7 | 48.2 | 42.5 | 88.2 |
| $Ba_{.567}Li_{.117}Al_{11}O_{7.5}$: 0.096 Eu, 0.35 Mn[1] | 2 | 47.3 | 39.9 | 84.4 |

[1]Molar formulas are based upon starting materials.

EXAMPLE III

Following the procedures given in Example I a number of other materials are prepared and are tested for relative brightness under ultraviolet excitation. Results of tests of these materials are known in Table II. The compositions are identified on FIG. 1 by numbers 1-14.

TABLE II

Physical Data For Compositions Within The Area Shown In FIG. 1.

| No. in FIG. 1 | Starting Composition (Mole Percent) | | | Relative* Brightness | | Phase+ Assemblage |
|---|---|---|---|---|---|---|
| | BaO | $LiO_{.5}$ | $AlO_{1.5}$ | Eu + Mn | Eu | |
| 1 | 8 | .5 | 91.5 | 74 | — | — |
| 2 | 4.8 | 1.0 | 94.2 | 88 | 97 | 85A, 15α |
| 3 | 2.5 | .5 | 97 | 74 | — | 50A, 50α |
| 4 | 8.1 | 3.2 | 88.7 | 79 | — | A |
| 5 | 2 | 5 | 93 | 83 | — | 40A, 45α, 15S |
| 6 | 5 | 7 | 88 | 87 | 99 | 95A, 5α, 15S |
| 7 | 5 | 9 | 86 | 99 | — | 80A, 5α, 15S |
| 8 | 8 | 9 | 83 | 70 | 95 | A |
| 9 | 5 | 11 | 84 | 100 | 100 | 90A, 10α |
| 10 | 2 | 13 | 85 | 62 | — | — |
| 11 | 5 | 13 | 82 | 99 | — | 95A, 5α |
| 12 | 7 | 13 | 80 | 86 | 97 | A |
| 13 | 3 | 17 | 80 | 64 | — | 65A, 35S |
| 14 | 7.7 | — | 92.3 | 60 | 70 | A |

*Brightness values are integrated plaque intensities determined on samples fired at 1550° C. Molar concentrations of activators were 0.096 Eu, 0.35 Mn, or 0.096 Eu, respectively, per mole of host.
+Numbers assigned to quantities of phases detected by powder x-ray diffraction are based on relative peak heights; A=magnetoplumbite phase, α = alpha alumina, S = spinel ($LiAl_5O_8$).

Figure 3:
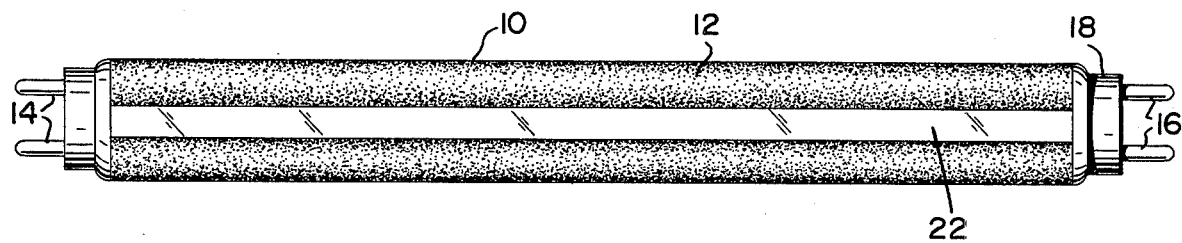
FIG. 3 illustrates a lamp of this invention.

Referring now in detail to FIG. 3, the lamp 10 has a seal, hollow glass tube 12 containing a fill of 85% argon and 15% helium (although other suitable ionizable gas fillings may be used). On the inside surface of glass envelope there is a coating 14 of the barium-lithium aluminate phosphor material of this invention. The phosphor coating 14 is shown in this embodiment to extend around 315° of the circumference of the tube; the other 45°, aperture 16 of the tube, is left free of the phosphor coating to allow light from the phosphor to immerge therethrough. Although this embodiment shows the foregoing width of the aperture the actual width of the aperture in practical applications is determined by the amount of light which is desired. Thus, sizes other than the 45° as shown in this embodiment can be utilized and can vary between 20° and 90°. The brightness in the aperture area increases as the aperture width is reduced.

At the end of the glass tube 12 there is electrode comprising an oxide coated tungsten foil, two auxiliary anodes and associated lead wires as shown for example in U.S. Pat. No. 2,761,566. An insulative plastic base with base carrying contacts 18 and 20 is illustrative in the Figure as well as in U.S. Pat. No. 2,896,187.

While there has been shown and described what are at present considered the preferred embodiments of the invention, it will be obvious to those skilled in the art that various changes and modifications may be made therein without departing from the scope of the invention as defined by the appended claims. What is claimed is:

1. A luminescent composition consisting essentially of (a) host consisting essentially of from about 2 to about 8 mole percent of barium oxide, from about 0.5 to about 20 mole percent of lithium oxide, and from about 80 to about 97.5 mole percent of aluminum oxide, said oxides being calculated on the basis of BaO, $\frac{1}{2}Li_2O$, and $\frac{1}{2}Al_2O_3$ respectively, and (b) as an activator from an effective amount to about 0.2 moles per mole of host of divalent europium and from an effective amount to about 0.45 moles per mole of host of divalent manganese, said effective amounts being sufficient to yield a green luminescence at about 515±2nm when said composition is excited by ultraviolet light and wherein lithium is present in an amount not greater than 1% by weight.

2. A composition according to claim 1 wherein barium oxide is from about 4 to about 7 mole percent.

3. A composition according to claim 1 wherein lithium oxide is from about 5 to about 14 mole percent.

4. A composition according to claim 1 wherein divalent europium is from about 0.025 to about 0.125 moles per mole of host.

5. A fluorescent lamp comprising (a) a pair of opposing electrodes, (b) a glass envelope disposed over said electrodes, (c) a fill of an ionizable gas inside of envelope and (d) as a coating on at least a portion of the inside of said envelope a coating of a luminescent composition consisting essentially of (a) host consisting essentially of from about 2 to about 8 mole percent of barium oxide from about 0.5 to about 20 mole percent of lithium oxide, and from about 80 to 97.5 mole percent of aluminum oxide, said oxides being calculated as BaO, $\frac{1}{2}Li_2O$, and $\frac{1}{2}Al_2O_3$ respectively, and (b) as an activator from an effective amount to about 0.2 moles per mole of host of divalent europium, from an effective amount to about 0.45 moles per mole of host of divalent manganese, said effective amounts being sufficient to yield a green luminescence at about 515±2nm when said composition is excited by ultraviolet light; and wherein lithium is present in an amount not greater than 1% by weight.

6. A lamp according to claim 5 wherein said barium oxide from about 4 to about 7 mole percent, and said lithium oxide is from about 5 to about 14 mole percent.

7. A lamp according to claim 5 wherein said europium is from about 0.125 to about 0.025 moles per mole of host.

* * * * *